(12) United States Patent
Lamontia

(10) Patent No.: US 9,610,807 B2
(45) Date of Patent: Apr. 4, 2017

(54) TIRE OVERLAY COMPOSITION

(71) Applicant: E I DU PONT DE NEMOURS AND COMPANY, Wilmington, DE (US)

(72) Inventor: Mark Allan Lamontia, Landenberg, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 264 days.

(21) Appl. No.: 14/151,115

(22) Filed: Jan. 9, 2014

(65) Prior Publication Data

US 2014/0190611 A1    Jul. 10, 2014

Related U.S. Application Data

(60) Provisional application No. 61/750,533, filed on Jan. 9, 2013.

(51) Int. Cl.
*B60C 9/18* (2006.01)
*B60C 9/22* (2006.01)
(Continued)

(52) U.S. Cl.
CPC .......... *B60C 9/1821* (2013.04); *B29D 30/20* (2013.01); *B60C 9/22* (2013.01); *B60C 1/00* (2013.01); *B60C 2009/2214* (2013.04); *B60C 2009/2223* (2013.04); *B60C 2009/2261* (2013.04); *B60C 2009/2276* (2013.04); *B60C 2009/2295* (2013.04)

(58) Field of Classification Search
CPC ......... B60C 9/18; B60C 9/1835; B60C 9/185; B60C 9/20; B60C 9/2009; B60C 9/22
See application file for complete search history.

(56) References Cited

U.S. PATENT DOCUMENTS

| 367,143 A | 7/1887 | Howell |
| 3,094,511 A | 6/1963 | DuPont |

(Continued)

FOREIGN PATENT DOCUMENTS

| JP | 2000-108612 | * 4/2000 |
| JP | 2001-347809 | * 12/2001 |

(Continued)

OTHER PUBLICATIONS

Machine translation of JP 2006-76407, 2006.*

(Continued)

*Primary Examiner* — Justin Fischer

(57) ABSTRACT

A tire comprising an overlay ply wherein (i) the shoulder section of the overlay comprises an elastomer and short polymeric or non-polymeric reinforcing fibers present in an amount of from 0.1 to 10 parts fiber per hundred parts of elastomer, the short fibers having a tenacity of at least 2 grams per dtex, a modulus of at least 10 grams per dtex and a length of from 0.1 to 8 mm and wherein the fibers are aligned substantially parallel to each other in a controlled angle of orientation within the overlay wherein the orientation is selected such that it decreases tire noise, and (ii) the section of overlay in the crown of the tire comprising cords of continuous filament polymeric fibers or continuous strands of metal or combinations thereof, the cords being aligned in a circumferential direction around the tire.

4 Claims, 5 Drawing Sheets

(51) Int. Cl.
  *B29D 30/20* (2006.01)
  *B60C 1/00* (2006.01)

(56) References Cited

U.S. PATENT DOCUMENTS

| | | | |
|---|---|---|---|
| 3,354,127 A | 11/1967 | DuPont | |
| 3,767,756 A | 10/1973 | Blades | |
| 3,819,587 A | 6/1974 | Kwoleck | |
| 3,869,429 A | 3/1975 | Blades | |
| 3,869,430 A | 3/1975 | Blades | |
| 4,172,938 A | 10/1979 | Mera et al. | |
| 4,176,705 A | 12/1979 | Russell et al. | |
| 4,228,118 A | 10/1980 | Wu et al. | |
| 4,276,348 A | 6/1981 | Wu et al. | |
| 4,344,908 A | 8/1982 | Smith et al. | |
| 4,457,985 A | 7/1984 | Harpell et al. | |
| 4,478,083 A | 10/1984 | Hassler et al. | |
| 4,533,693 A | 8/1985 | Wolfe et al. | |
| 4,703,103 A | 10/1987 | Wolfe et al. | |
| 4,772,678 A | 9/1988 | Sybert et al. | |
| 4,807,680 A | 2/1989 | Weidenhaupt et al. | |
| 4,847,350 A | 7/1989 | Harris | |
| 4,871,004 A | 10/1989 | Brown et al. | |
| 4,878,343 A | 11/1989 | Weidenhaupt et al. | |
| 5,089,591 A | 2/1992 | Gregory et al. | |
| 5,276,128 A | 1/1994 | Rosenberg et al. | |
| 5,331,053 A | 7/1994 | Atkinson et al. | |
| 5,391,623 A | 2/1995 | Frances | |
| 5,480,941 A | 1/1996 | Frances | |
| 5,526,859 A * | 6/1996 | Saito | B60C 1/0025 152/209.4 |
| 5,551,498 A | 9/1996 | Komatsuki | |
| 5,674,969 A | 10/1997 | Sikkema et al. | |
| 5,830,395 A | 11/1998 | Vercesi et al. | |
| 6,106,752 A | 8/2000 | Chang et al. | |
| 6,315,019 B1 * | 11/2001 | Garlaschelli | B60C 9/18 152/526 |
| 6,412,533 B1 * | 7/2002 | Armellin | B60C 9/06 152/458 |
| 6,899,782 B1 | 5/2005 | Chang et al. | |
| 7,005,022 B2 | 2/2006 | Sasaki | |
| 2002/0069948 A1 | 6/2002 | Sentmanat | |
| 2003/0114641 A1 | 6/2003 | Kelly et al. | |
| 2007/0221303 A1 | 9/2007 | Sandstrom et al. | |
| 2009/0159171 A1 | 6/2009 | Volpi | |
| 2010/0236695 A1 * | 9/2010 | Lamontia | B29D 30/52 156/123 |

FOREIGN PATENT DOCUMENTS

| | | | |
|---|---|---|---|
| JP | 2004-345609 | * | 12/2004 |
| JP | 2005-239070 | * | 9/2005 |
| JP | 2006-76407 | * | 3/2006 |
| JP | 2011-136671 | * | 7/2011 |

OTHER PUBLICATIONS

Machine translation of JP 2004-345609, 2004.*
Machine translation of JP 2000-108612, 2000.*
Machine translation of JP 2001-347809, 2001.*
Machine translation of JP 2005-239070, 2005.*
Machine translation of JP 2011-136671, 2011.*

* cited by examiner

TIRE OVERLAY COMPOSITION

BACKGROUND OF THE INVENTION

1. Field of the Invention

This invention is directed to tire overlay compositions that reduce tire noise.

2. Description of the Related Art

There is a continued need for improved passenger car and truck tire performance. Key performance attributes include noise, handling, wear, rolling resistance, and ride comfort. Reduced tire noise is becoming an industry focus as tire companies strive to reduce noise radiated from automobile and truck tires. For example, the European Union is putting in place legislation to significantly reduce pass-by noise from tires.

Certain fibers have been utilized in high performance tire production. U.S. Patent Publication No. 2002/0069948 teaches the use of short fibers at angles that are largely perpendicular to the tire surface. The purpose of these constructions is said to be improvement in handling and/or acceleration. U.S. Patent Publication No. 2007/0221303 utilizes short fibers in a construction that enhances the tread directional stiffness. These fibers are said to be aligned somewhat perpendicular to the longitudinal, circumferential direction of the tread. U.S. Pat. No. 4,871,004 discloses aramid-reinforced elastomers where short, discontinuous, fibrillated aramid fibers are dispersed in rubber. The arrangements disclosed in this patent are said to maximize lateral (axial or circumferential) stiffness and modulus. These arrangements, however, are not taught to be beneficial for noise reduction.

U.S. Patent Publication No. 2010/0236695 pertains to tires having a composite tread block which comprises a cured elastomer and from 0.1 to 10 parts per hundred parts by weight of the elastomer of fibers characterized as having a tenacity of at least 6 grams per dtex and a modulus of at least 200 grams per dtex. A major portion of said fibers are oriented in a direction such that noise arising from tire tread contacting the road surface is reduced.

SUMMARY OF THE INVENTION

This invention is directed to a tire comprising an overlay ply wherein
(i) the shoulder section of the overlay comprises an elastomer and short polymeric or non-polymeric reinforcing fibers present in an amount of from 0.1 to 10 parts fiber per hundred parts of elastomer, the short fibers having a tenacity of at least 2 grams per dtex, a modulus of at least 10 grams per dtex and a length of from 0.1 to 8 mm and wherein the fibers are aligned substantially parallel to each other in a controlled angle of orientation within the overlay wherein the orientation is selected such that it decreases tire noise, and
(ii) the section of overlay in the crown of the tire comprising cords of continuous filament polymeric fibers or continuous strands of metal or combinations thereof, the cords being aligned in a circumferential direction around the tire.

The invention further pertains to tire comprising an overlay wherein
(i) the overlay in the crown section of the tire comprises an elastomer and short polymeric or non-polymeric reinforcing fibers present in an amount of from 0.1 to 10 parts fiber per hundred parts of elastomer, the short fibers having a tenacity of at least 2 grams per dtex, a modulus of at least 10 grams per dtex and a length of from 0.1 to 8 mm and wherein the fibers are aligned substantially parallel to each other in a controlled angle of orientation within the overlay wherein the orientation is selected such that it decreases tire noise, and
(ii) the shoulder section of the overlay of the tire comprising cords of continuous filament polymeric fibers or continuous strands of metal or combinations thereof, the cords being aligned in a circumferential direction around the tire.

DETAILED DESCRIPTION OF THE INVENTION

Figure 1:
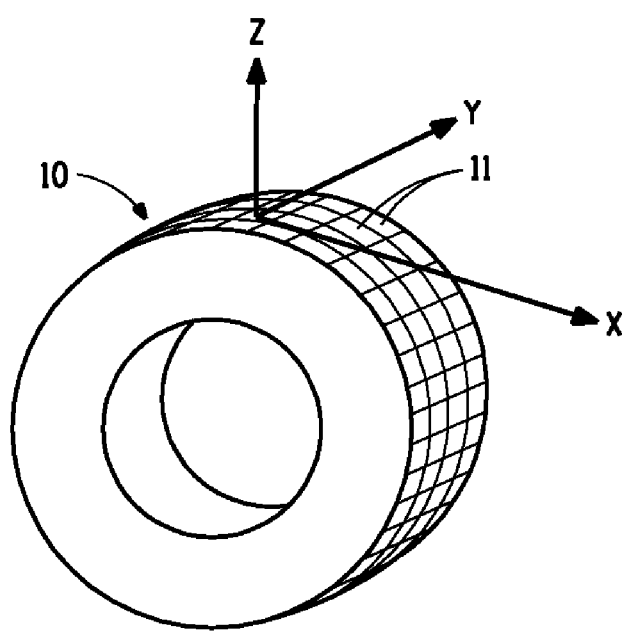
FIG. 1 is a representation of the tire coordinate system.

Vehicle tire noise arises from many sources. FIG. 1 will be helpful in describing how this noise arises and to define directions used herein. FIG. 1 shows generally at 10 a tire having tread blocks 11 and the principal coordinate axes pertaining to the tire. The circumferential direction is in the direction of travel; X. The meridional direction is shown as Y and the radial direction as Z. The meridional direction is sometimes referred to as the axial or lateral direction. To clarify the spatial relationships, the road surface is in the XY plane. A tire also uses a component called a subtread just beneath the tread that provides support to the tread blocks 11. The subtread is between the tread blocks and the first reinforced layer, either the overlay (also called a cap ply), the belts, or the breakers.

Figure 2:
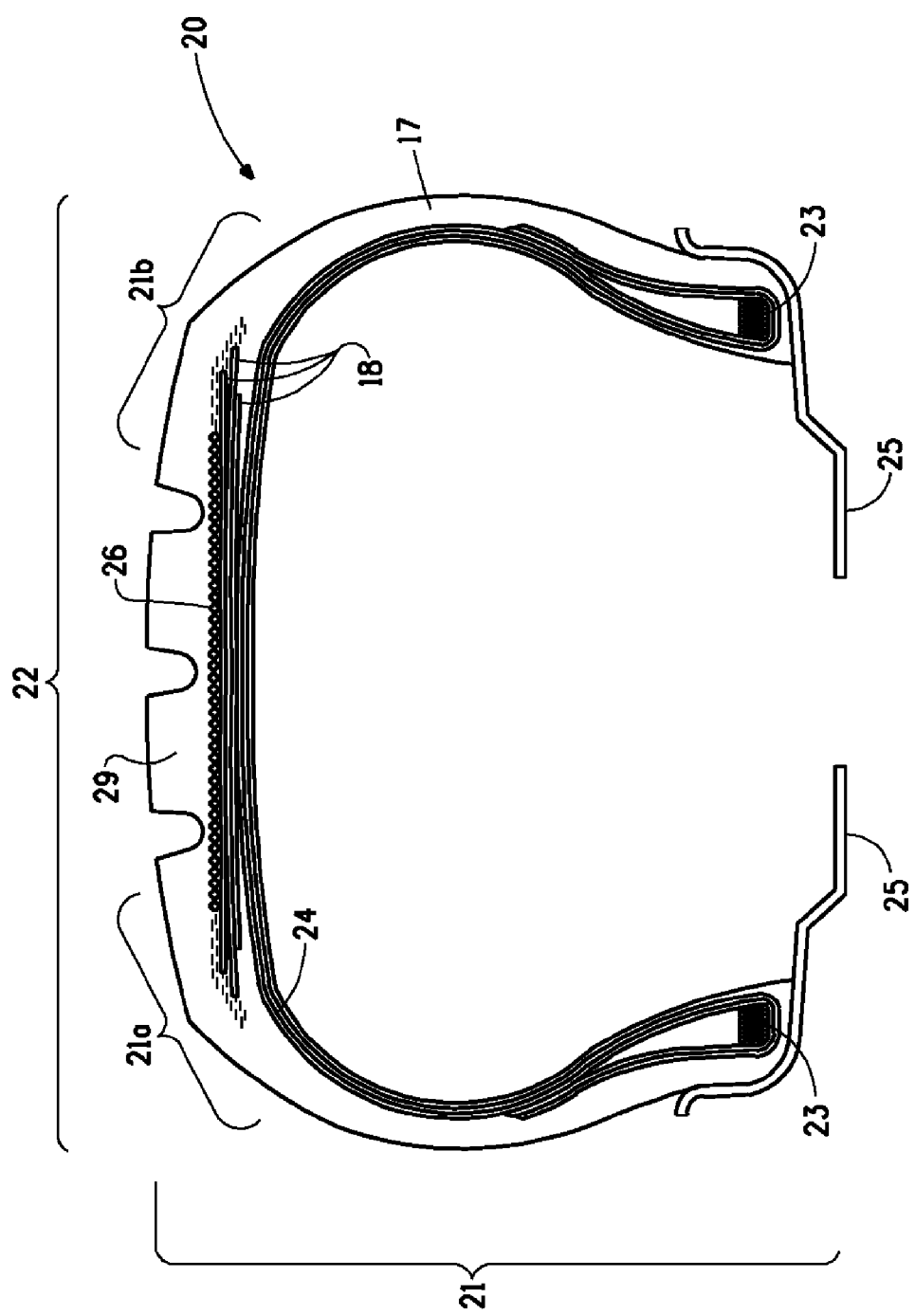
FIG. 2 is a tire cross-section.

Shown generally at 20 in FIG. 2 is a tire cross-section comprising two principal sections, a sidewall section 21 and a crown section 22. A tire sidewall is the area from the tire bead 23 to the tread 29. "Crown" means that tire portion within the tire tread width limits. The tire shoulder 21a and 21b is the sidewall upper portion just below the tread edge. Beads 23 are located where the tire sits on the rim flange. Beads are composed of high-tensile steel wire formed into inextensible hoops. The bead functions to anchor the plies and to hold the assembly on the rim of the wheel. The shape or contour of the bead conforms to the flange of the wheel to prevent the tire from rocking or slipping on the rim. Carcass cords 24 provide strength and load bearing capabilities to the tire. "Carcass" means the tire structure apart from the belt structure, tread, under-tread, and sidewall rubber over the plies, but including the beads. A carcass is sometimes called a casing. The carcass cords are anchored by wrapping them around the bead wires 23. Also shown in FIG. 2 are wheel rims 25. "Tread" means that portion of a tire that comes into contact with the road when the tire is normally inflated and under normal load. A "belt" is a narrow layer of tire cord material directly under the tread in the tire crown. In truck tires, belts are commonly called breakers. An overlay 26 is a reinforcement layer located between the outer facing surface of the tire steel belt(s) 18 and below the tire treads 29. Traditionally the overlay comprises continuous filament cords running in the tire circumferential direction.

A first embodiment of this invention is a tire comprising an overlay wherein
(i) the shoulder section of the overlay comprises an elastomer and short polymeric
reinforcing fibers present in an amount of from 0.1 to 10 parts fiber per hundred parts of elastomer, the short fibers having a tenacity of at least 2 grams per dtex, a modulus of at least 10 grams per dtex and a length of from 0.1 to 8 mm and wherein the fibers are aligned substantially parallel to each other in a controlled orientation angle within the overlay wherein the orientation is selected such that it decreases tire tread noise, and
(ii) the tire overlay section in the crown comprises cords of continuous filament polymeric fibers or continuous metal strands or combinations thereof, the cords being circumferentially aligned around the tire.

Figure 3:
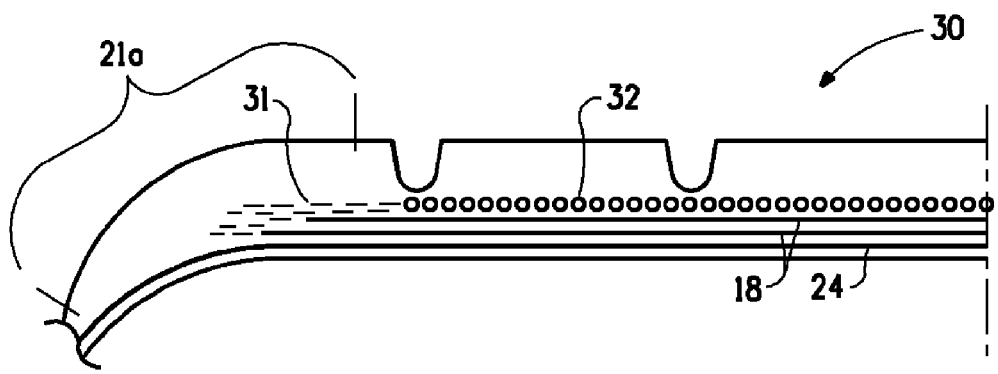
FIG. 3 is a part of a tire cross-section of the overlay region showing a first embodiment of this invention.

FIG. 3 depicts this first embodiment and shows generally at 30 a tire section comprising a carcass 24 and belts 18. Above the belt is an overlay. In the tire shoulder region 21a, the overlay comprises the elastomer and short polymeric reinforcing fibers 31. In the crown region, the overlay comprises cords 32 of continuous filament polymeric fibers or continuous metal strands or combinations thereof. Note that the short fibers are shown as being oriented in a meridional direction purely for illustrative purposes.

A second embodiment of this invention is a tire comprising an overlay wherein
(i) the tire crown section overlay comprises an elastomer and short polymeric reinforcing fibers present in an amount of from 0.1 to 8 parts fiber per hundred parts of elastomer, the short fibers having a tenacity of at least 2 grams per dtex, a modulus of at least 10 grams per dtex and a length of from 0.1 to 8 mm and wherein the fibers are aligned substantially parallel to each other in a controlled orientation angle within the overlay wherein the orientation is selected such that it decreases tire tread noise, and
(ii) the tire overlay shoulder section comprises cords of continuous filament polymeric fibers or continuous metal strands or combinations thereof, the cords being circumferentially aligned around the tire.

Figure 4:
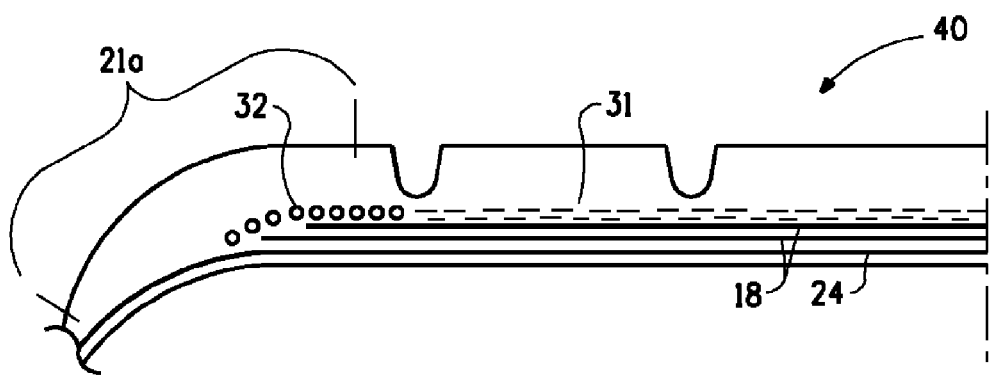
FIG. 4 is a part of a tire cross-section of the overlay region showing a second embodiment of this invention.

FIG. 4 depicts second embodiment and shows generally at 40 a tire section comprising a carcass 24 and belts 18. Above the belt is an overlay. In the tire shoulder region 21a, the overlay comprises cords 32 of continuous filament polymeric fibers or continuous metal strands or combinations thereof. In the tire crown region, the overlay comprises the elastomer and short polymeric reinforcing fibers 31.

Figure 5:
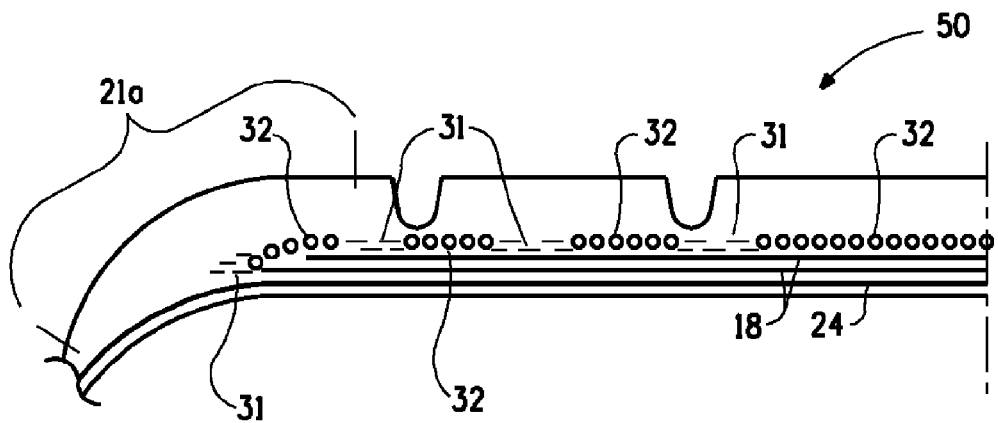
FIG. 5 is a part of a tire cross-section of the overlay region showing a third embodiment of this invention.

FIG. 5 depicts a third embodiment of this invention and shows generally at 50 a tire section comprising an overlay wherein the overlay shoulder section 21a and the overlay crown section both comprise a mixture of elastomer and short polymeric reinforcing fibers 31 and cords 32 of continuous filament polymeric fibers or continuous strands of metal or combinations thereof.

Figure 6:
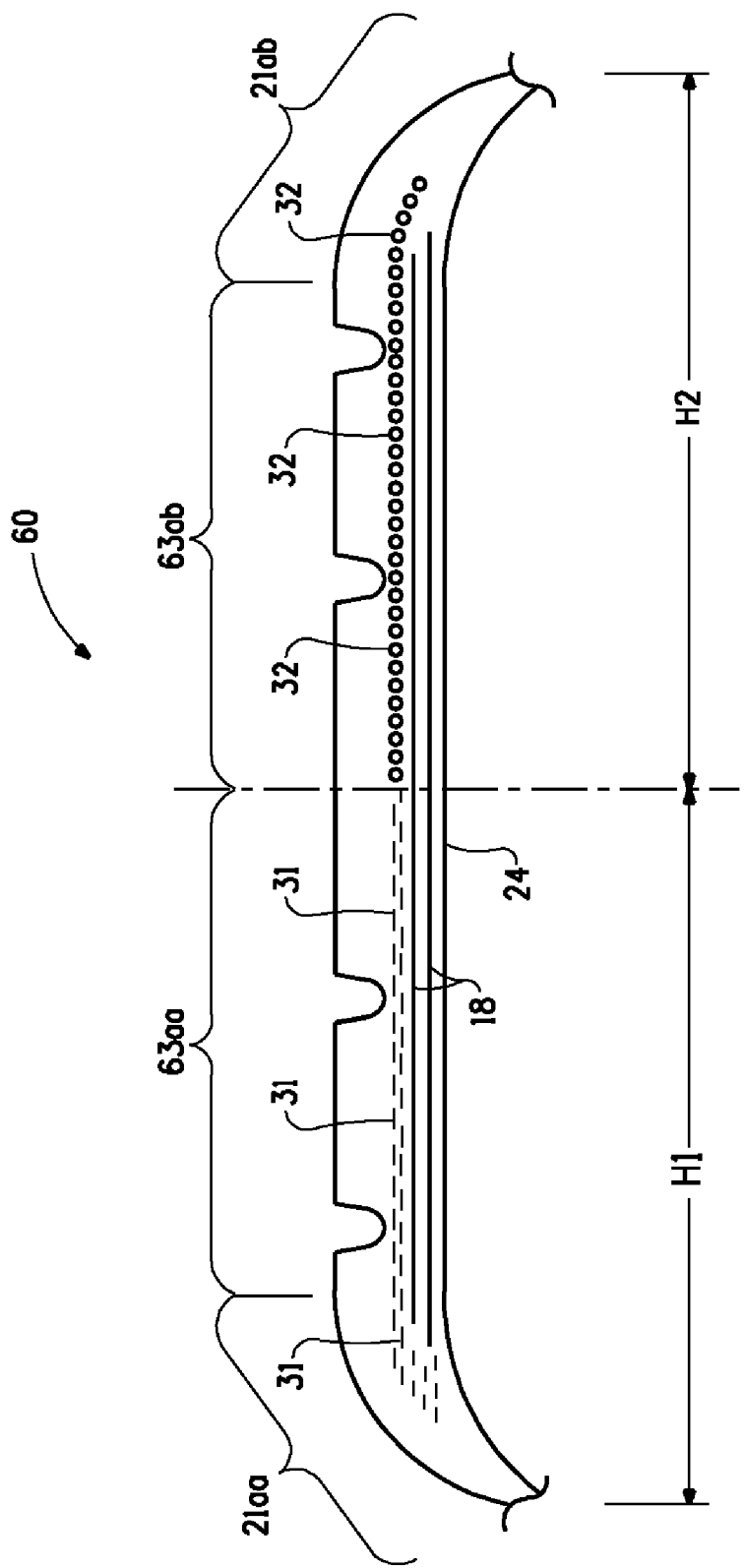
FIG. 6 depicts a tire cross-section of the overlay region of a tire showing a fourth embodiment of this invention.

FIG. 6 depicts a fourth embodiment of this invention and shows generally at 60 a cross section of a tire. One half of the overlay, a first half (H1), comprises shoulder section 21as and crown section 63aa. The first half of the overlay further comprises elastomer and short polymeric reinforcing fibers 31. The other half of the overlay, a second half (H2), comprises shoulder section 21ab and crown section 63ab. The second half of the overlay further comprises continuous filament polymeric fibers or continuous metal strands or combinations thereof 32. The position of H1 and H2 are interchangeable as to being on the inside or outside of the tire as placed on a vehicle In yet another embodiment, the tire overlay ply comprises an elastomer and short polymeric or non-polymeric reinforcing fibers present in an amount of from 0.1 to 10 parts fiber per hundred parts of elastomer, the short fibers having a tenacity of at least 2 grams per dtex, a modulus of at least 10 grams per dtex and a length of from 0.1 to 8 mm and wherein the fibers are aligned substantially parallel to each other in a controlled angle of orientation within the overlay wherein the orientation is selected such that it decreases tire noise. There are no continuous filament polymeric fibers or continuous strands of metal in the overlay.

The elastomeric sections comprising short fibers or continuous fibers may be formed from one piece or a plurality of pieces positioned adjacent to each other either across the width of the section or through the thickness of the section.

Short Fiber

Short fibers in an elastomer form one component of the overlay. By judicious selection of short fiber orientation and planar arrangement of layers in an overlay comprising short fibers, it is possible to customize the overlay design to address specific noise reduction challenges. In some tire constructions, the fibers are substantially aligned meridionally within the overlay. In certain tires, the short fibers are substantially aligned with each other in a substantially circumferential direction. In certain tires, the short fibers are substantially aligned with each other in a substantially radial direction. By substantially we mean that over 50% of the short fibers within a layer are oriented in one direction. More preferably over 70% of the short fibers within a layer are oriented in one direction. Most preferably over 85% of the short fibers within a layer are oriented in one direction. By aligned or oriented is meant the fiber is arranged such that the fiber long dimension is oriented in the aligned direction. This fiber alignment gives anisotropic mechanical stiffness properties to tire overlay region comprising the short fibers. In some embodiments, the length of the short fibers is from 0.1 to 8 mm while in other embodiments it is from 0.1 to 3 mm.

Figure 7:
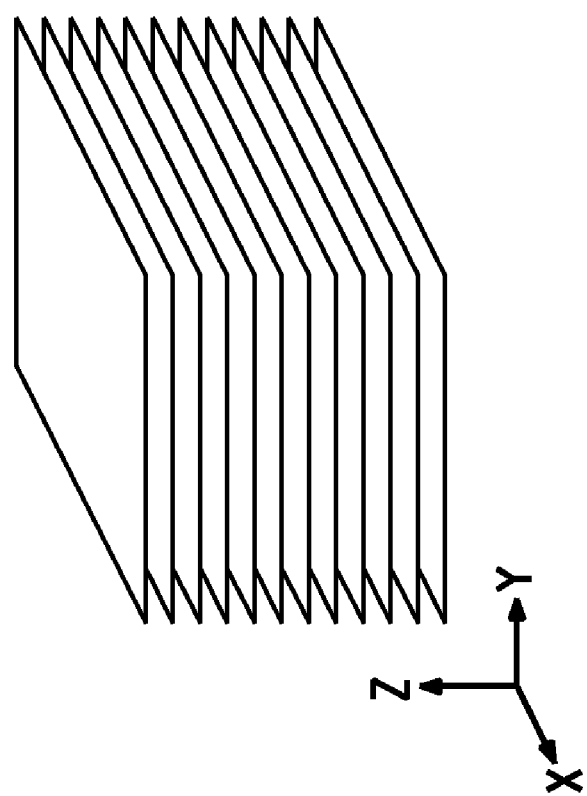
FIG. 7 depicts orientation of planes in a common direction.
Figure 8:
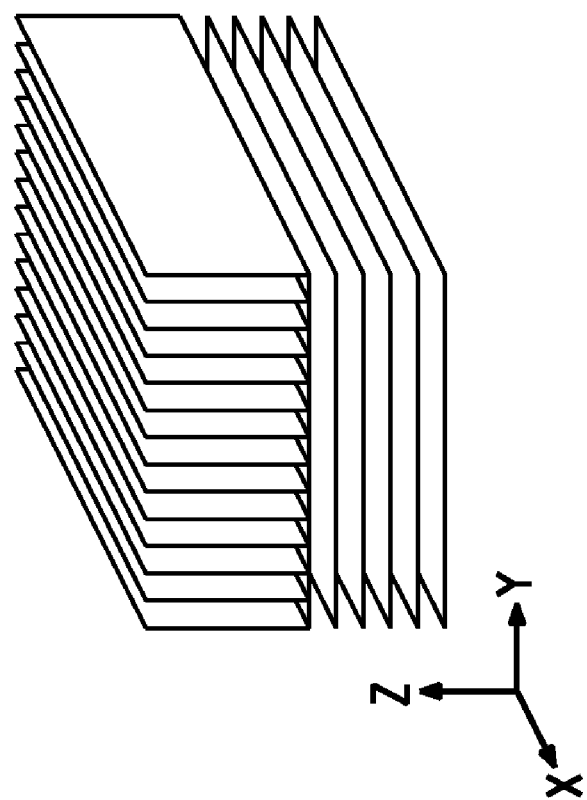
FIG. 8 depicts orientation of planes in two directions.

The overlay layers containing the aligned fibers can also be oriented in different planar arrangements. For example, FIG. 7 depicts an overlay layer XY planar orientation. These layers could contain meridionally (Y) oriented fibers, circumferentially (X) oriented fibers, or fibers arranged to alternate between meridional (Y) and circumferential (X) orientation. Fiber orientation could likewise be different for different parts of the overlay layer having different planar orientations as depicted in FIG. 8, and in particular could comprise two reinforcement directions. For example, in the XZ planes, the fibers could be circumferential (X) or radial (Z), whereas in the XY planes, the fibers could be circumferential (X) or meridional (Y). In the YZ plane (not shown), the fibers could be meridional (Y) or radial (Z). For example, it has been determined that fibers oriented meridionally and circumferentially in the overlay and fibers oriented radially within the overlay are very effective in reducing noise. On the other hand, orienting fibers circumferentially within the overlay may be the easiest to produce, but provide a smaller relative benefit in noise reduction. Between these two situations there is a plethora of possible fiber orientations in the overlay structure. For example, in further reference to FIG. 8, the fibers in an XZ plane of an overlay could be oriented at some angle between the circumferential (X) and radial (Z) directions. Likewise, the fibers in an XY plane of an overlay could be oriented at some angle between the circumferential (X) and meridional (Y) directions. Appropriate choice of tooling and manufacturing systems including extrusion dies will result in the desired orientation of fiber in the extruded profile of each subtread.

Although fiber orientation in layers in the XY, YZ, or XZ planes are preferred to be orthogonal, fibers may also be aligned non-orthogonally at an angle of between 5 to 85 degrees to either the circumferential, meridional or radial directions. More preferably, the fibers are aligned at an angle between 15 and 70 degrees. Such bias angle orientation can be achieved by calendaring the elastomeric sheet in two directions.

Another aspect of the invention concerns processes for producing a composite overlay described herein, where the process comprises producing one or more layers by calendering or extruding a mixture of the elastomer and the reinforcing fiber. In some embodiments, the process additionally comprises consolidating a plurality of layers.

This invention in which there is controlled orientation of fibers in the elastomer thus differs from a carbon-black or other particulate reinforced rubber compound which manifests random or isotropic reinforcement. The short fiber reinforcement is added with short fibers, floc, or pulp. In some embodiments, the higher the short fiber or pulp modulus, the better is the obtained performance. Thus, high modulus fibers such as aramid fibers and pulp can advantageously placed in the plane of the overlay. It should be noted, however, that in addition to aramids, any short fibers or pulp that increase the meridional overlay stiffness would work to some degree. Exemplary short fibers include those made from a polymer such as aromatic polyamide, aromatic copolyamide, aliphatic polyamide, polyester, polyolefin, polyazole, and mixtures thereof. Such fibers may be used directly during the compounding of the fiber or may be added as a premix or masterbatch in which the fiber is pre-blended into a concentrate with some of the elastomer.

Tire overlays of this invention comprise cured elastomer having from 0.1 to 10 parts per hundred parts by weight of the elastomer (phr) of short fibers, floc, or pulp. In some embodiments, the short fiber content is from 1 to 8 phr or even from 2 to 6 phr. The fibers have a tenacity of at least 2 grams per dtex and a modulus of at least 10 grams per dtex. In some embodiments, the fibers have a tenacity of from 500 to 1100 grams per dtex. The short fibers may be produced from continuous fibers to form floc, pulp, and other chopped fiber forms and unless noted otherwise as discussed herein, any of these forms may be considered as fibers. Some fibers have a length to diameter ratio of 5 to 10,000, more preferably 10 to 5000. Short fibers having a diameter of less than 15 micrometers, as discussed herein relating to this invention, include pulp and fibers known as floc. Floc is made by cutting continuous fiber into short lengths from about 0.1 to 8 millimeters, more preferably from about 0.1 to 6 millimeters. Manufacture of such fibers is well known to those skilled in the art. Certain of these fibers, including those coated with an adhesion-promoting agent, are available commercially.

Some fibers used in the present invention are in the form of pulp. Pulp comprises fibrillated fibers that in some cases are produced by chopping longer fibers. Aramid pulp, for example, can be made by refining aramid fibers and, in some embodiments, has a length distribution of up to about 8 millimeters with an average length of about 0.1 to 4 millimeters. Commercially available aramid pulps include Kevlar® pulp, from E.I. du Pont de Nemours and Company, Wilmington Del., (DuPont) and Teijin™ Twaron® pulp. Another form of pulp, known as micropulp, can be produced in accordance with US Patent Publication No. 2003/0114641. The short fibers may also be of metal or ceramic.

Cords

The shoulder and/or crown sections of the overlay also contain cords as a second component of the overlay structure. The cords may comprise continuous polymeric filaments, strands of metallic wire or both. "Filament" as used herein means a relatively flexible, macroscopically homogeneous body having a high ratio of length to width across its cross-sectional area perpendicular to its length. Herein, the term "fiber" is used interchangeably with the term "filament". A cord may be a single polymeric filament or wire strand or a plurality of polymeric filaments or wire strands. In some embodiments two or more cords may be twisted together to form a merge cord. A merge cord is sometimes referred to as a cabled or hybrid cord. Examples of merge cords are exemplified by U.S. Pat. Nos. 5,551,498; 4,176,705; 4,807,680; and 4,878,343; and United States Patent Publication No. 2009/0159171. The cords are arranged in a circumferential direction around the tire.

A preferred metallic wire is steel. A typical steel composition comprises a carbon content of from 0.60% to 1.1%, a manganese content ranging from 0.20 to 0.90% and a silicon content ranging from 0.10 to 0.90%. Other elements such as sulfur, phosphorous, chromium boron, cobalt, nickel and vanadium may each be present at a level below 0.5%.

The steel wire may have cross-sections comprising one or more axes of symmetry. For example, an oval or rectangular cross-section has two axes of symmetry and a triangular cross-section has three axes of symmetry. In preferred embodiments, the steel wire cross section is round or is essentially round.

In some embodiments, the major cross-sectional dimension of the wire is in the 0.04 mm to 1.1 mm range and more preferably from 0.07 mm to 0.60 mm. This dimension is the diameter in the case of a round cross section. The wire is typically provided with a coating conferring affinity for rubber. Such coatings include those that can react with sulfur atoms in the rubber, such as copper, zinc and alloys of such metals, for example brass. In a preferred embodiment, zinc is used as the coating substrate when polyamide yarns form the outer surface of the hybrid cord, otherwise brass is the preferred coating material.

Elastomeric components comprising short fibers or continuous fibers may be formed from one piece or from a plurality of pieces positioned adjacent to each other.

Fiber Polymer

The polymeric material used in the short fibers of the elastomeric component and continuous filaments of the cord component can be made from any polymer that produces a high-strength fiber. Suitable polymeric materials are aromatic polyamide, aromatic copolyamide, aliphatic polyamide, polyester, polyolefin, polyazole, and mixtures thereof. Suitable non-polymeric materials are glass, carbon and cellulosic fibers. Some fibers may be in the form of nanotubes. Both single-wall and multi-wall nanotubes are suitable. A preferred aromatic polyamide is para-aramid. When the polymer is polyamide, in some embodiments, aramid is preferred. The term "aramid" means a polyamide wherein at least 85% of the amide (—CONH—) linkages are attached directly to two aromatic rings. Suitable aramid fibers include Twaron®, Sulfron®, Technora® all available from Teijin Aramid, Heracon™ from Kolon Industries Inc. or Kevlar® available from DuPont. Aramid fibers are described in Man-Made Fibres—Science and Technology, Volume 2, Section titled Fibre-Forming Aromatic Polyamides, page 297, W. Black et al., Interscience Publishers, 1968. Aramid fibers and their production are, also, disclosed in U.S. Pat. Nos. 3,767,756; 4,172,938; 3,869,429; 3,869,430; 3,819,587; 3,673,143; 3,354,127; and 3,094,511.

In some embodiments, the preferred aramid is a para-aramid. One preferred para-aramid is poly (p-phenylene terephthalamide) which is called PPD-T. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether.

Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride or the aramid.

When the polymer is polyolefin, in some embodiments, polyethylene or polypropylene is preferred. Polyolefin fibers can only be used when the processing temperatures required to compound the fiber and elastomer, to calender or extrude the compound or to cure the compound in the tire assembly is less than the melting point of the polyolefin. The term "polyethylene" means a predominantly linear polyethylene material of preferably more than one million molecular weight that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, propylene, and the like, or low molecular weight additives such as anti-oxidants, lubricants, ultra-violet screening agents, colorants and the like which are commonly incorporated. Such polyethylenes are commonly known as extended chain polyethylene (ECPE) or ultra high molecular weight polyethylene (UHMWPE). Preparation of polyethylene fibers is discussed in U.S. Pat. Nos. 4,478,083, 4,228,118, 4,276,348 and 4,344,908. High molecular weight linear polyolefin fibers are commercially available. Preparation of polyolefin fibers is discussed in U.S. Pat. No. 4,457,985.

In some preferred embodiments polyazoles are polyarenazoles such as polybenzazoles and polypyridazoles. Suitable polyazoles include homopolymers and, also, copolymers. Additives can be used with the polyazoles and up to as much as 10 percent, by weight, of other polymeric material can be blended with the polyazoles. Also copolymers can be used having as much as 10 percent or more of other monomer substituted for a monomer of the polyazoles. Suitable polyazole homopolymers and copolymers can be made by known procedures, such as those described in or derived from U.S. Pat. Nos. 4,533,693, 4,703,103, 5,089,591, 4,772,678, 4,847,350, and 5,276,128.

Preferred polybenzazoles include polybenzimidazoles, polybenzothiazoles, and polybenzoxazoles and more preferably such polymers that can form fibers having yarn tenacities of 30 grams per denier (gpd) or greater. In some embodiments, if the polybenzazole is a polybenzothioazole, preferably it is poly(p-phenylene benzobisthiazole). In some embodiments, if the polybenzazole is a polybenzoxazole, preferably it is poly(p-phenylene benzobisoxazole) and more preferably the poly(p-phenylene-2,6-benzobisoxazole) called PBO.

Preferred polypyridazoles include polypyridimidazoles, polypyridothiazoles, and polypyridoxazoles and more preferably such polymers that can form fibers having yarn tenacities of 30 gpd or greater. In some embodiments, the preferred polypyridazole is a polypyridobisazole. One preferred poly(pyridobisozazole) is poly(1,4-(2,5-dihydroxy)phenylene-2,6-pyrido[2,3-d:5,6-d']bisimidazole which is called PIPD. Suitable polypyridazoles, including polypyridobisazoles, can be made by known procedures, such as those described in U.S. Pat. No. 5,674,969.

The term "polyester" as used herein is intended to embrace polymers wherein at least 85% of the recurring units are condensation products of dicarboxylic acids and dihydroxy alcohols with linkages created by formation of ester units. This includes aromatic, aliphatic, saturated, and unsaturated di-acids and di-alcohols. The term "polyester" as used herein also includes copolymers (such as block, graft, random and alternating copolymers), blends, and modifications thereof. In some embodiments, the preferred polyesters include poly(ethylene terephthalate), poly(ethylene naphthalate), and liquid crystalline polyesters. Poly (ethylene terephthalate) (PET) can include a variety of comonomers, including diethylene glycol, cyclohexanedimethanol, poly(ethylene glycol), glutaric acid, azelaic acid, sebacic acid, isophthalic acid, and the like. In addition to these comonomers, branching agents like trimesic acid, pyromellitic acid, trimethylolpropane and trimethyloloethane, and pentaerythritol may be used. The poly(ethylene terephthalate) can be obtained by known polymerization techniques from either terephthalic acid or its lower alkyl esters (e.g. dimethyl terephthalate) and ethylene glycol or blends or mixtures of these. Another potentially useful polyester is poly(ethylene napthalate) (PEN). PEN can be obtained by known polymerization techniques from 2, 6 napthalene dicarboxylic acid and ethylene glycol.

Liquid crystalline polyesters may also be used in the invention. By "liquid crystalline polyester" (LCP) herein is meant polyester that is anisotropic when tested using the TOT test or any reasonable variation thereof, as described in U.S. Pat. No. 4,118,372. One preferred form of liquid crystalline polyesters is "all aromatic"; that is, all of the groups in the polymer main chain are aromatic (except for the linking groups such as ester groups), but side groups which are not aromatic may be present.

E-Glass is a commercially available low alkali glass. One typical composition consists of 54 weight % $SiO_2$, 14 weight % $Al_2O_3$, 22 weight % CaO/MgO, 10 weight % $B_2O_3$ and less then 2 weight % $Na_2O/K_2O$. Some other materials may also be present at impurity levels.

S-Glass is a commercially available magnesia-alumina-silicate glass. This composition is stiffer, stronger, more expensive than E-glass and is commonly used in polymer matrix composites. Carbon fibers are commercially available and well known to those skilled in the art. In some embodiments, these fibers are about 0.005 to 0.010 mm in diameter and composed mainly of carbon atoms. Cellulosic fibers can be made by spinning liquid crystalline solutions of cellulose esters (formate and acetate) with subsequent saponification to yield regenerated cellulosic fibers.

Elastomer

As used herein, the terms "rubber" and "elastomer" may be used interchangeably, unless otherwise provided. The terms "rubber composition", "compounded rubber" and "rubber compound" may be used interchangeably to refer to "rubber which has been blended or mixed with various ingredients and materials" and such terms are well known to those having skill in the rubber mixing or rubber compounding art. The terms "cure" and "vulcanize" may be used interchangeably unless otherwise provided. In the description of this invention, the term "phr" refers to parts of a respective material per 100 parts by weight of rubber, or elastomer.

The elastomers of the present invention include both natural rubber, synthetic natural rubber and synthetic rubber. Synthetic rubbers compounds can be any which are dissolved by common organic solvents and can include, among many others, polychloroprene and sulfur-modified chloroprene, hydrocarbon rubbers, butadiene-acrylonitrile copolymers, styrene butadiene rubbers, chlorosulfonated polyethylene, fluoroelastomers, polybutadiene rubbers, polyisoprene rubbers, butyl and halobutyl rubbers and the like. Natural rubber, styrene butadiene rubber, polyisoprene rubber and polybutadiene rubber are preferred. Mixtures of rubbers may also be utilized.

Production of Tires

In some aspects, the invention concerns processes for producing a composite overlay as described herein, where the process comprises, as one step, producing one or more layers by calendering or extruding a mixture of the elastomer and the short reinforcing fiber. The process can additionally comprise consolidating a plurality of layers of short fiber in elastomer. Different layers may or may not have the same fiber orientation. Methods of calendering, extruding and consolidating such composite layers are well known to those skilled in the art and are described below. The overlay can be formed by means well known to those skilled in the art.

Fiber alignment may be achieved by several well known methods. One process involves high shear mixing of raw materials (polymer, fiber, and other additives) to compound the elastomer followed by roll milling and/or calendering. The high shear mixing ensures that the fiber and other additives are uniformly dispersed in the elastomer. At this stage, the fibers within the elastomer are randomly oriented. The first compounding process phase involves mastication or breaking down of the polymer. Natural rubber may be broken down on open roll mills, but it is a more common practice to use a high shear mixer having counter rotating blades such as a Banbury or Shaw mixer. Sometimes a separate premastication step may be used. For synthetic rubbers, premastication is only necessary when the compound contains a polymer blend. This is followed by masterbatching when most of the ingredients are incorporated into the rubber. This ensures a thorough and uniform ingredient dispersion in the rubber. During the mixing process it is important to keep the temperature as low as possible. Ingredients not included in this step are those constituting the curing system. These are normally added in the last step, usually at a lower temperature.

An example of a typical mixing process is as follows. This is for a two stage mixing of Kevlar® pulp dispersed in an elastomer (Kevlar® Engineered Elastomer (Kevlar® EE)) into a neoprene type rubber.

First Stage

Add successively, while mixing, half the Neoprene, then the Kevlar® EE and finally the remaining Neoprene and magnesium oxide Mix effectively for 1-1.5 minutes Add loose fibers (if any) Mix at least 30 seconds Add fillers, plasticizers, antioxidant and other additives Raise mixer speed as needed to achieve the desired temperature and continue mixing until good dispersion of the fiber has been obtained, Sheet off the first stage compound at a dumping temperature not exceeding 105-110° C. and allow to cool.

Second Stage

Add successively half the cooled first stage, followed by zinc oxide, curatives and the remainder of the first pass mix. Dump at 100-105° C. into a sheeting mill.

Further information on elastomer compounding is contained in pages 496 to 507 of The Vanderbilt Rubber Handbook, Thirteenth Edition, published by R. T. Vanderbilt Company Inc., Norwalk, Conn., and in U.S. Pat. Nos. 5,331,053; 5,391,623; 5,480,941 and 5,830,395.

In some circumstances, mixing of ingredients can also be achieved by roll milling. Fiber alignment is achieved during the calendering and/or milling process which is carried out under heat and pressure. A calendar is a set of multiple large diameter rolls that squeeze rubber compound into a thin sheet.

Another approach is to use an extrusion process where the raw materials are mixed and extruded into a sheet in a single process. The extruder consists of a screw and barrel, screw drive, heaters and a die. The extruder applies heat and pressure to the compound. By appropriate selection of the extrusion die channel design and geometry, the fibers may be aligned in the X, Y, or Z directions within the extrudate corresponding, respectively, to the circumferential, meridional and radial directions in the overlay. In a converging die, the channel thickness decreases towards the die exit resulting in fibers being aligned in the machine direction (circumferential direction within the plane of the extruded sheet). Insertion of a baffle plate in a die assembly will result in the fibers aligning in the cross-machine direction (meridional) within the plane of the extruded sheet. A die design in which the thickness of the channel opening increases towards exit face of the die will give a fiber orientation perpendicular to the plane (radial) of the extruded sheet. For tire treads, the die cross sectional profile is adapted to the desired tread design and the tread can be extruded in one piece. In such a tread, all the fibers are aligned in the direction governed by the chosen die. Should different fiber orientations be desired in different sections or zones across the tread, then multiple die heads are required with each die being selected to give the desired fiber orientation appropriate for that zone.

There are three main stages in tire production, namely component assembly, pressing, and curing. In component assembly, a drum or cylinder is used as a tool onto which the various components are laid. During assembly the various components are either spliced or bonded with adhesive. A typical sequence for layup of tire components is to first position a rubber sheet inner liner. Such a liner is compounded with additives that result in low air permeability. This makes it possible to seal air in the tire. The second component is a layer of calendered body ply fabric or cord coated with rubber and an adhesion promoter. The body ply or plies are turned down at the drum. Steel beads are applied and the liner ply is turned up thereby wrapping the bead. Bead rubber includes additives to maximize strength and toughness. Next the apex is positioned. The apex is a triangular extruded profile that mates against the bead and provides a cushion between the rigid bead and the flexible inner liner and body ply assembly. This is followed by a pair of chafer strips and the sidewalls. These resist chafing when mounting the tire onto the rim. The drum is then collapsed and the first stage assembly is ready for the second component assembly stage.

Second stage assembly is done on an inflatable bladder mounted on steel rings. The green first stage assembly is fitted over the rings and the bladder inflates it up to a belt guide assembly. Steel belts to provide puncture resistance are then placed in position. The belts are calendered sheets consisting of a layer of rubber, a layer of closely spaced steel cords, and a second rubber layer. The steel cords are oriented radially in a radial tire construction and at opposing angles in a bias tire construction. Passenger vehicle tires are usually made with two or three belts. An overlay is applied over the top belt. For a composite overlay as described herein, the short fiber elastomeric strip component containing oriented fiber and the continuous filament cord component are positioned in the desired location, for example, as per FIGS. 3 to 5. Techniques for aligning the fibers in the elastomer are processes that develop shear conditions during the mixing/compounding step. Such methods include milling, calendering, injection molding and extrusion. Examples of these techniques can be found in U.S. Pat. No. 6,106,752 (injection molding); U.S. Pat. No. 6,899,782 (extrusion) and U.S. Pat. No. 7,005,022 (extrusion and needling).

The final component, the tread rubber profile of subtread and tread block layers is then applied. The tread assembly is rolled to consolidate it to the belts and the finished assembly (green cover) is then detached from the machine. Many higher-performance tires include an optional extruded cushion component between the belt package and the tread to isolate the tread from mechanical wear from the steel belts. If desired the tire building process can be automated with each component applied separately along a number of assembly points. Following layup, the assembly is pressed to consolidate all the components into a form very close to the final tire dimension.

Curing or vulcanizing of the elastomer into the final tire shape takes place in a hot mold. The mold is engraved with the tire tread pattern. The green tire assembly is placed onto the lower mold bead seat, a rubber bladder is inserted into the green tire and the mold closed while the bladder inflates to a pressure of about 25 kgf/cm$^2$. This causes the green tire to flow into the mold taking on the tread pattern. The bladder is filled with a recirculating heat transfer medium such as steam, hot water or inert gas. Cure temperature and curing time will vary for different tire types and elastomer formulations but typical values are a cure temperature of about 150 to 180 degrees centigrade with a curing time from about 12 to 25 minutes. For large tires, the cure time can be much longer. At the end of the cure, the pressure is bled down, the mold opened and the tire stripped from the mold. The tire may be placed on a post-cure inflator that will hold the tire fully inflated while it cools.

EXAMPLES

The invention is illustrated by the following examples that are designed to be illustrative but not limiting in nature, wherein all parts, proportions, and percentages are by weight unless otherwise indicated.

Identical test specimens, both in composition and dimensions, were used to represent the overlay composition and structure. In the construction of a conventional tire, different compositions may be used for this component part.

A rubber compound similar to that described above was used in all examples. The rubber was formed into a sheet via milling and calendaring.

Comparative Example A

In this example, rubber sheets comprising continuous filament cords of nylon 66 at 32 ends per inch (approximately 13 ends per cm) were incorporated into a compounded rubber strip. The strip was placed over a cylindrical molded rubber composite that mimics a tire with inner-liner, carcass and belt components in place. The components were assembled on a mandrel and the rubber cured under heat and pressure to give a cured rubber cylinder representative of a tire.

Example 1

Example 1 simulated a tire overlay comprising the nylon cords of Comparative Example A in the shoulder and short aramid fibers (Kevlar EE®) in the center.

The Kevlar EE® used was merge 1F722 commercially available from DuPont and was used at a level of 3 parts per hundred parts of rubber. The rubber composition was the same as for Comparative Example A. The fibers were incorporated into the rubber compound by a method similar to that described for a two pass mix in the Kevlar® Engineered Elastomer Processing Guide. The compound containing the fiber was then milled to align the fibers and formed into a sheet. Two second sheet strips of Comparative Example A were placed over the cylindrical mold mandrel, one strip at either end. A first strip comprising the compounded Kevlar EE® elastomer was placed around the central part of the mandrel. The rubber was then cured under heat and pressure to give a cured rubber cylinder having an internal diameter of 5.25 inches (133.3 mm) and a thickness of 0.1875 inches (4.76 mm). The fiber in the Kevlar® EE was aligned in the hoop direction.

Example 2

Example 2 simulated a tire overlay in which the entire overlay comprised short aramid fibers and rubber. The Kevlar EE® elastomer and rubber materials were the same as for Example 1.

Testing of the above samples to simulate noise emitted from a tire would demonstrate a significant noise reduction from the design of Examples 1 and 2 when compared with that of Comparative Example A.

What is claimed:

1. A tire comprising an overlay having crown and shoulder sections, wherein
   (i) the overlay in the crown section of the tire comprises an elastomer and short polymeric or non-polymeric reinforcing fibers present in an amount of from 0.1 to 10 parts fiber per hundred parts of elastomer, the short reinforcing fibers having a tenacity of at least 2 grams per dtex, a modulus of at least 10 grams per dtex and a length of from 0.1 to 8 mm and wherein the short reinforcing fibers are the only reinforcing fibers in the crown section and the fibers are aligned substantially parallel to each other in an orientation within the overlay selected from the group consisting of circumferential, meridional, radial, and combinations thereof, and
   (ii) the shoulder sections of the overlay of the tire comprises cords of continuous filament polymeric fibers or continuous strands of metal or combinations thereof, the cords being aligned in a circumferential direction around the tire and wherein the continuous filament polymeric fibers or continuous strands of metal or combinations thereof are the only reinforcing fibers in the shoulder section.

2. The overlay ply of claim 1, wherein the short reinforcing fibers in at least one XY or XZ layer are in a circumferential orientation.

3. The overlay ply of claim 1, wherein the short reinforcing fibers in at least one XY or YZ layer are in a meridional orientation.

4. The overlay ply of claim 1, wherein the short reinforcing fibers in at least one XZ or YZ layer are in a radial orientation.

\* \* \* \* \*